UNITED STATES PATENT OFFICE.

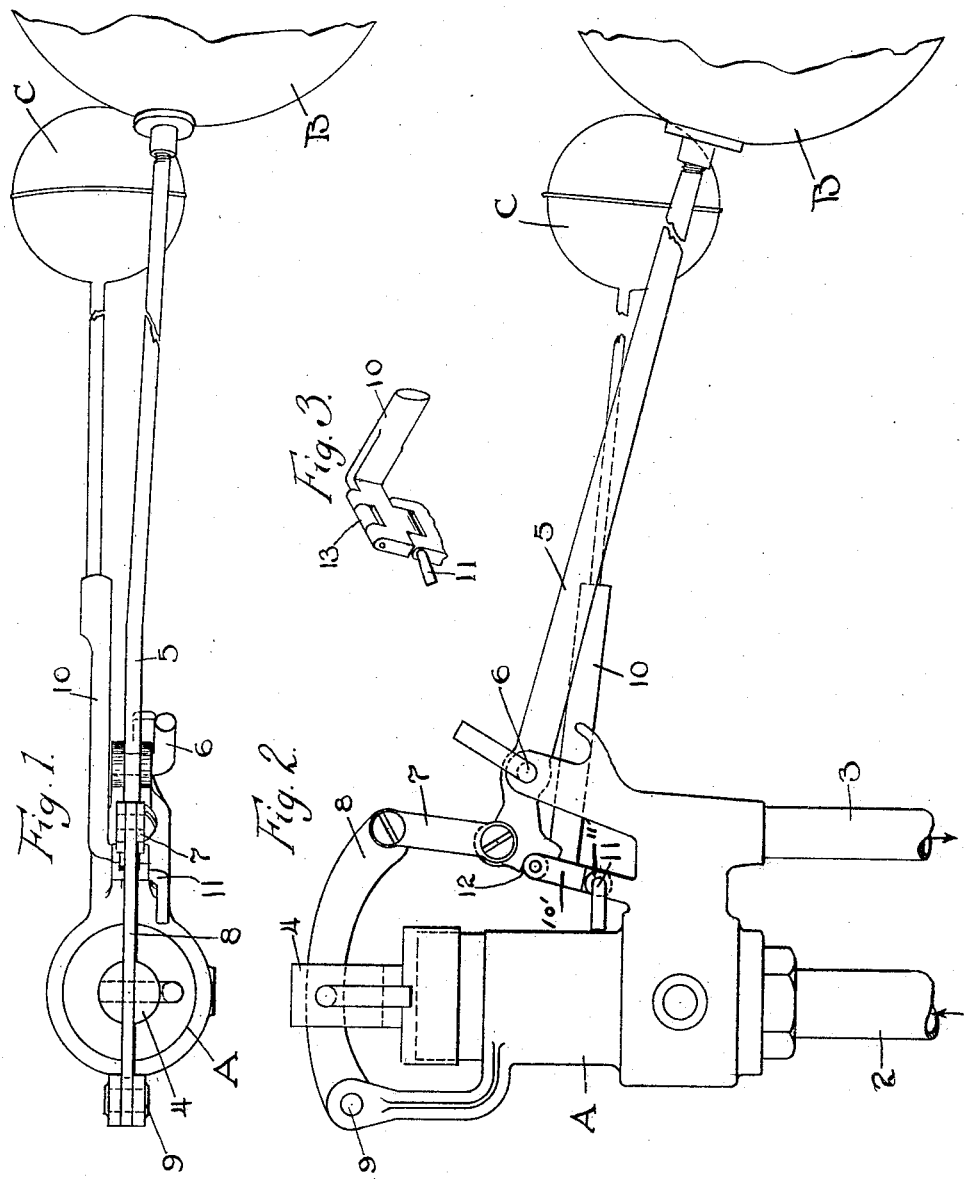

MICHAEL W. SCHMITZ, OF ST. PAUL, MINNESOTA, ASSIGNOR OF TWO-FIFTHS TO HENRY J. KAIM, OF ST. PAUL, MINNESOTA.

FLUSHING-VALVE.

1,115,584.     Specification of Letters Patent.     Patented Nov. 3, 1914.

Application filed May 26, 1913. Serial No. 769,875.

*To all whom it may concern:*

Be it known that I, MICHAEL W. SCHMITZ, a citizen of the United States, residing at St. Paul, in the county of Ramsey and State of Minnesota, have invented certain new and useful Improvements in Flushing-Valves, of which the following is a specification.

My invention relates to improvements in flushing valves, its object being particularly to provide means for holding the valve controlling float in a position which will hold the valve open until the water within the tank reaches the normal level, said means being then operative to release the float and allow it to rise to the top of the water.

To this end the invention consists in the feature of construction, combination, and arrangement of parts hereinafter described and claimed.

In the accompanying drawings forming part of this specification, Figure 1 is a top view of flush valve mechanism and connected float partly broken away and provided with my improvements; Fig. 2 is a side elevation of the same; and Fig. 3 is a detail view of the fulcrum end of my controlling device.

Referring to the drawings, A represents the casing of the valve, which casing connects the ordinary inlet pipe 2 and outlet pipe 3 to the containing tank, not shown. The valve, of suitable construction, not shown, is inclosed in the casing in position to close the passage between the inlet and outlet pipes, the stem 3 of the valve extending upwardly through the top of the casing. The valve is actuated in the ordinary manner by means of a float B carried by an arm 5, the arm 5 having fulcrum support 6 upon the valve casing. The fulcrumed end of the float arm is connected by a link 7 with one end of an arm 8, said arm at its opposite end having fulcrum support 9 on the opposite side of the valve casing and intermediately passing through the valve stem.

In carrying out my invention I employ a secondary float C supported by an arm 10, the float preferably having adjustable threaded connection with the arm.

The end of the arm 10 is formed into a right-angularly projected body or stud 10, whose lower edge is provided with a bearing 11' which is journaled to a suitably formed support provided on the valve-casing, the pin 11 passing through the support and bearing to secure the latter in operative position. The upper edge of the stud or body 10' is recessed to receive a journaled roller 13, which has a rolling contact with a shoulder 12 formed on the overhang provided on the rear end of the adjacent arm 5.

In operation, the valve is held closed in the ordinary manner by reason of the main float being held in raised position by the water in the tank, thus holding the valve stem lowered through the connecting mechanism. Where, in flushing, the level of the water in the tank is lowered by the outlet valve ordinarily employed, but not herein shown, the main float will drop as indicated in Fig. 2. As the main float drops the supplementary float 6 will also drop, bringing the roller 13 upon the fulcrumed end of the supplementary float arm underneath the shoulder 12. The main float now being in lowered position will hold the valve open and thus allow the water to pass from the pipe 2 through the pipe 3 into the tank. As the water rises in the tank, the supplementary float will be raised, but as will be evident the main float will be held lowered by the engagement of the roller 13 and shoulder 12 until the roller 13 passes out of such engagement, when the main float will be immediately raised to valve closing position by the water. Consequently the valve will be held in full open position during the filling operation of the tank, instead of being gradually closed as would be the case if the main float gradually raised. This construction has the advantage of obviating the disagreeable noise that is ordinarily made by reason of the valve being gradually closed and also makes a more rapid filling of the tank than where the valve is gradually closed.

I claim as my invention:

1. A flushing valve mechanism comprising in combination with a valve, a float arm pivoted on the casing of said valve and having a rearwardly projecting extension, means linking said extension to said valve, a secondary float arm also pivoted on the casing of said valve, and a locking extension on said auxiliary float arm formed to engage below said rearwardly projecting extension to lock the latter in the elevated position.

2. A flushing valve mechanism comprising in combination with a valve, a float arm pivoted on the casing of said valve and having a rearwardly projecting extension provided with a locking recess, an auxiliary float arm pivoted below said rearwardly projecting extension and having a head for engagement with said locking recess when said extension is located in elevated position, and floats carried by each of said arms.

In testimony whereof I affix my signature in presence of two witnesses.

MICHAEL W. SCHMITZ.

Witnesses:
H. S. JOHNSON,
H. SWANSON.

Copies of this patent may be obtained for five cents each, by addressing the "Commissioner of Patents, Washington, D. C."